United States Patent
Bastide et al.

(10) Patent No.: US 10,778,791 B2
(45) Date of Patent: Sep. 15, 2020

(54) COGNITIVE INSIGHT INTO USER ACTIVITY INTERACTING WITH A SOCIAL SYSTEM

(71) Applicant: INTERNATIONAL BUSINESS MACHINES CORPORATION, Armonk, NY (US)

(72) Inventors: Paul R. Bastide, Boxford, MA (US); Lin Sun, Cary, NC (US); Liam S. Harpur, Skerries (IE); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 16/040,392

(22) Filed: Jul. 19, 2018

(65) Prior Publication Data
US 2020/0028924 A1    Jan. 23, 2020

(51) Int. Cl.
*G06F 13/00* (2006.01)
*H04L 29/08* (2006.01)
*G06Q 50/00* (2012.01)

(52) U.S. Cl.
CPC ............. *H04L 67/22* (2013.01); *G06Q 50/01* (2013.01); *H04L 67/306* (2013.01)

(58) Field of Classification Search
CPC .... G06F 3/0481; G06F 3/04817; G06F 13/00; G06F 15/16; G06Q 10/10; G06Q 30/02; G06Q 50/00; G06Q 50/01; H04L 12/18; H04L 12/1813; H04L 12/1818; H04L 12/2602; H04L 29/06; H04L 29/08; H04L 29/0809; H04L 29/08072; H04L 29/08117;
(Continued)

(56) References Cited

U.S. PATENT DOCUMENTS 8,676,937 B2 *  3/2014  Rapaport ................ H04L 51/32
                                                                709/219
8,838,564 B2    9/2014  Sahni et al.
(Continued)

OTHER PUBLICATIONS

"The Importance of Social Media in Business Can't Be Ignored," [online] Radial, Dec. 1, 2016, retrieved from the Internet: <https://www.radial.com/insights/importance-social-media-business-cant-be-ignored>, 6 pg.
(Continued)

*Primary Examiner* — Robert B Harrell
(74) *Attorney, Agent, or Firm* — Cuenot, Forsythe & Kim, LLC (57) ABSTRACT

A current user activity of a first user interacting with a first social system can be monitored. A cognitive insight into at least one user activity of at least a second user relating to the current user activity of the first user can be generated. The cognitive insight can include a listing of user activity data, each representing a respective user activity of at least the second user relating to the current user activity of the first user. The cognitive insight can indicate, for each user activity data contained in the listing, a respective duration of time for which the user activity data is to be presented to the first user. The cognitive insight can be communicated to the first social system, which can present to the first user each user activity data in the listing for the respective duration of time indicated in the cognitive insight.

18 Claims, 3 Drawing Sheets

(58) Field of Classification Search
CPC ......... H04L 41/22; H04L 43/00; H04L 51/32; H04L 67/02; H04L 67/10; H04L 67/306; H04L 67/22; H04N 21/8358
USPC .................................. 709/219, 224; 715/753
See application file for complete search history.

(56) References Cited

U.S. PATENT DOCUMENTS

| | | | | |
|---|---|---|---|---|
| 2012/0290950 | A1* | 11/2012 | Rapaport | H04L 51/32 715/753 |
| 2014/0164603 | A1 | 6/2014 | Castel et al. | |
| 2014/0344718 | A1* | 11/2014 | Rapaport | H04L 51/32 715/753 |
| 2015/0347536 | A1 | 12/2015 | Smith | |
| 2015/0356626 | A1 | 12/2015 | Chawla et al. | |
| 2016/0042282 | A1* | 2/2016 | Amini | G06Q 50/01 706/46 |
| 2016/0132488 | A1* | 5/2016 | Clark | G06F 16/248 704/9 |
| 2016/0132591 | A1* | 5/2016 | Clark | G06F 16/248 707/723 |

OTHER PUBLICATIONS

"IBM Big Data Analytics: Insights Without Limits," [online] IBM Corporation [retrieved Jul. 18, 2018], retrieved from the Internet: <https://www.ibm.com/it-infrastructure/us-en/cognitive-computing/analytics/>, 5 pg.

"Using Cognitivie Computing to Gain Deeper Individual Insights," [online] IBM Corporation [retrieved Jul. 18, 2018], retrieved from the Internet: <https://www.ibm.com/watson/whitepaper/cognitive-computing-individual-insights/>, 34 pg.

"Instant Insight", [online] Financial Times, [retrieved Mar. 1, 2018], retrieved from the Internet: <https://www.ft.com/instant-insight?mhq5j=e3>, 7 pg.

Cooke, M. A. et al., "Cognitive Insight in Psychosis: The Relationship between self-certainty and self-reflection dimensions and neuropsychological measures," [online] Psychiatry Res., Jul. 30, 2010, vol. 178, No. 2, pp. 284-289, retrieved from the Internet: <https://www.ncbi.nlm.nih.gov/pmc/articles/PMC3184477/>, 16 pg.

"Data Analytic Systems with IBM Servers and Storage," [online] IBM Corporation [retrieved Mar. 1, 2018], retrieved from the Internet: <https://www.ibm.com/it-infrastructure/us-en . . . >, 8 pg.

* cited by examiner

Monitor a current user activity of a first user interacting with a first social system
202

↓

Responsive to the monitoring the current user activity of the first user interacting with the first social system, generate, in real time using a processor, a cognitive insight into at least one user activity of at least a second user relating to the current user activity of the first user, the cognitive insight comprising a listing of user activity data, each user activity data representing a respective user activity of at least the second user relating to the current user activity of the first user, and the cognitive insight indicating, for each user activity data contained in the listing, a respective duration of time for which the user activity data is to be presented to the first user
204

↓

Communicate the cognitive insight to the first social system, wherein, responsive to receiving the cognitive insight, the first social system presents, in real time, to the first user each user activity data contained in the listing of user activity data for the respective duration of time indicated in the cognitive insight
206

Analyze the current user activity of the first user interacting with the first social system, the analyzing the current user activity comprising determining social media content which the first user is reading, viewing or to which the first user is listening
302

↓

Analyze the user activity of at least the second user interacting with at least one social system selected from a group consisting of the first social system and at least a second social system, the analyzing the user activity of at least the second user interacting with the at least one social system comprising determining the user activity of at least the second user relating to the current user activity of the first user
304

COGNITIVE INSIGHT INTO USER ACTIVITY INTERACTING WITH A SOCIAL SYSTEM

BACKGROUND

The present invention relates to data processing systems, and more specifically, to data analytics pertaining to user activities interacting with social systems.

Social systems host social media. Social media is directed to the online sharing of data. Social media is the collective of online communications channels dedicated to community-based input, interaction, content-sharing and collaboration. Websites and applications dedicated to forums, microblogging, social networking, social bookmarking, social curation and wikis are among different types of social media. Social media is becoming an integral part of life online as social websites and applications proliferate. Indeed, traditional online media often include social components, such as comment fields for users.

SUMMARY

A method can include monitoring a current user activity of a first user interacting with a first social system. The method also can include, responsive to the monitoring the current user activity of the first user interacting with the first social system, generating, in real time using a processor, a cognitive insight into at least one user activity of at least a second user relating to the current user activity of the first user, the cognitive insight including a listing of user activity data, each user activity data representing a respective user activity of at least the second user relating to the current user activity of the first user, and the cognitive insight indicating, for each user activity data contained in the listing, a respective duration of time for which the user activity data is to be presented to the first user. The method also can include communicating the cognitive insight to the first social system, wherein, responsive to receiving the cognitive insight, the first social system presents, in real time, to the first user each user activity data contained in the listing of user activity data for the respective duration of time indicated in the cognitive insight.

A system includes a processor programmed to initiate executable operations. The executable operations can include monitoring a current user activity of a first user interacting with a first social system. The executable operations also can include, responsive to the monitoring the current user activity of the first user interacting with the first social system, generating, in real time, a cognitive insight into at least one user activity of at least a second user relating to the current user activity of the first user, the cognitive insight including a listing of user activity data, each user activity data representing a respective user activity of at least the second user relating to the current user activity of the first user, and the cognitive insight indicating, for each user activity data contained in the listing, a respective duration of time for which the user activity data is to be presented to the first user. The executable operations also can include communicating the cognitive insight to the first social system, wherein, responsive to receiving the cognitive insight, the first social system presents, in real time, to the first user each user activity data contained in the listing of user activity data for the respective duration of time indicated in the cognitive insight.

A computer program product includes a computer readable storage medium having program code stored thereon. The program code is executable by a data processing system to initiate operations. The operations can include monitoring a current user activity of a first user interacting with a first social system. The operations also can include, responsive to the monitoring the current user activity of the first user interacting with the first social system, generating, in real time, a cognitive insight into at least one user activity of at least a second user relating to the current user activity of the first user, the cognitive insight including a listing of user activity data, each user activity data representing a respective user activity of at least the second user relating to the current user activity of the first user, and the cognitive insight indicating, for each user activity data contained in the listing, a respective duration of time for which the user activity data is to be presented to the first user. The operations also can include communicating the cognitive insight to the first social system, wherein, responsive to receiving the cognitive insight, the first social system presents, in real time, to the first user each user activity data contained in the listing of user activity data for the respective duration of time indicated in the cognitive insight.

BRIEF DESCRIPTION OF THE DRAWINGS

FIG. 2 is a flowchart illustrating an example of a method of presenting to a user activity data of other users.

FIG. 3 is a flowchart illustrating an example of a method of analyzing user activity.

DETAILED DESCRIPTION

This disclosure relates to data processing systems, and more specifically, to data analytics pertaining to user activities interacting with social systems. In accordance with the inventive arrangements disclosed herein, current user activities of users interacting with social systems can be monitored. Based on such monitoring, cognitive insights relating to the user activities of others that relate to the current user activities can be determined using cognitive analytics, and corresponding information can be presented to the users performing the current user activities. Such information can provide a better understanding to the users of social media content they are reading, viewing and/or to which they are listening. Moreover, the information can be presented to the users for determined durations of time, which provides ephemeral boosts to the user understanding of the social media content. The ephemeral boosts can enhance user insight into the social media content.

Several definitions that apply throughout this document now will be presented.

As defined herein, the term "user activity" means an activity of a user interacting with at least one social system.

As defined herein, the term "social system" means at least one data processing system (e.g., server) including one or more processors and memory that hosts social media.

As defined herein, the term "social media content" means content shared by one or more users via a social system.

As defined herein, the term "natural language" is a language spoken and/or written by human beings that is not a computer programming language.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

As defined herein, the term "contact" means a person (i.e., a human being) indicated in a contact list of a user and/or with whom a user shares social media content.

Figure 1:
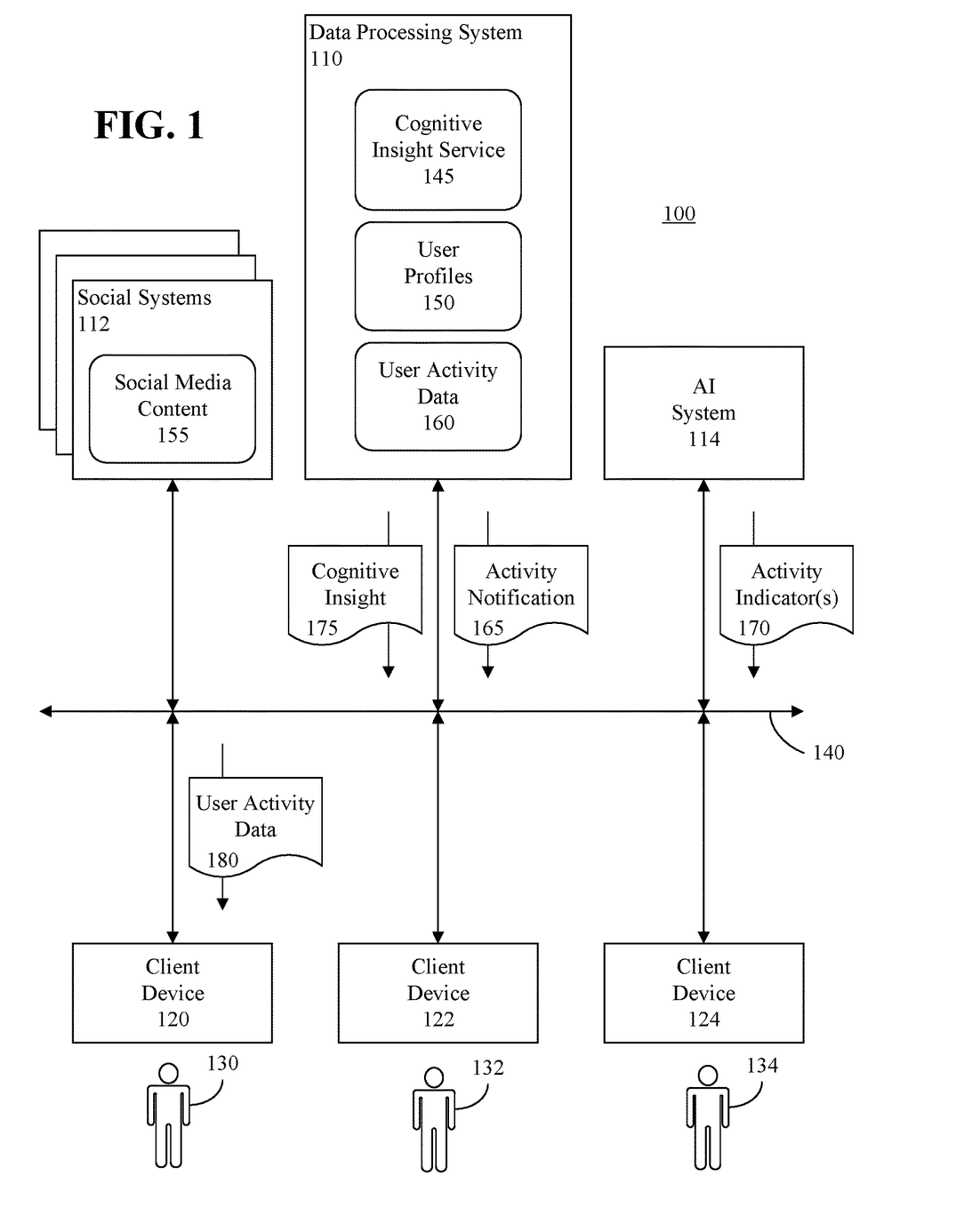
FIG. 1 is a block diagram illustrating an example of a computing environment.

FIG. 1 is a block diagram illustrating an example of a computing environment 100. The computing environment can include a data processing system 110, one or more social systems 112, an artificial intelligence (AI) system 114 and a plurality of client devices 120, 122, 124, used by users 130, 132, 134, which can be communicatively linked via a communication network 140. The communication network 140 is the medium used to provide communications links between various devices and data processing systems connected together within the computing environment 100. The communication network 140 may include connections, such as wire, wireless communication links, or fiber optic cables. The communication network 140 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In an arrangement, the data processing system 110 is implemented as one or more servers. The data processing system 110 can include a cognitive insight service 145. The cognitive insight service 145 can provide cognitive insights into social media content to help users better receive and understand the social media content and/or author additional social media content, as will be described herein.

Further, the data processing system 110 can store, or otherwise have access to, user profiles 150 of the users 130-134. The user profiles can be stored, for example, in a database. For example, the user profiles 150 can be stored in a database stored within at least one computer readable storage medium (e.g., memory elements) within the data processing system 110, or stored in a database stored on one or more computer readable storage mediums (e.g., storage devices and/or storage systems) to which the data processing system 110 is communicatively linked, for instance via the communication network 140. In another arrangement, the user profiles can be stored in a database stored by the social systems 112, and the data processing system 110 can access the user profiles via the communication network 140.

The user profile 150 of each user 130-134 can include various information about the user, including one or more user identifiers, social systems 112 with which the user interacts, interests of the user, the user's hobbies, work information pertaining to the user, collaboration projects in which the user is a participant, education information about the user (e.g., schools/colleges/universities attended, subjects studied, etc.), and so on. The user profile 150 of each user 130-134 also can include pre-defined security and privacy configuration settings which specify whether the activities of the user interacting with the social systems 112 may be monitored and/or shared with other users. For example, the user profile 150 of each user 130-134 initially may include default security and privacy configuration settings, and the users 130-134 may change these default settings, for example using a security/privacy user interface menu provided by one or more of the social systems 112 and/or the cognitive insight service 145. Further, the users 130-134 can specify in the security and privacy configuration settings the types of interactions with the social systems 112 that may be monitored and/or shared (e.g., which accesses and shares may be monitored and/or shared based on the type of media content being accessed or shared). The users 130-134 also can specify in the security and privacy configuration settings contacts (e.g., other users or user groups) with whom information relating to the users' interactions with the social systems 112 is authorized to be shared. Further, the users 130-134 also can specify in the security and privacy configuration settings contacts for whom the users desire to receive cognitive insights generated from user activities of those contacts with the social systems 112.

The social systems 112 can be data processing systems (e.g., servers) that host social media, for example websites and/or applications dedicated to forums, microblogging, social networking, social bookmarking, social curation, collaboration (e.g., social collaboration and/or work collaboration) and wikis. The social media can host social media content 155, for example, social media posts, blog posts, articles, work items, tasks, chats, electronic mails (e-mails), text messages, instant messages, etc.

The AI system 114 can include one or more computer programs that use artificial intelligence to process and analyze both structured and unstructured data, for example as a service. An example of an AI system 114 is IBM Watson®. IBM Watson® is a system that applies advanced natural language processing, information retrieval, knowledge representation and reasoning, and machine learning technologies to the field of cognitive-computing data analytics. Examples of AI services the AI system 114 can provide include, but are not limited to, Watson Personality Insights, which predicts personality characteristics of users, Watson Discovery, which monitors and analyzes trends and patterns, Watson Language Translator, which translates text from one language to another, Watson Natural Language Understanding, which performs natural language processing (NLP) for advanced text analytics, Watson Natural Language Classifier, which interprets and classifies natural language, and so on. Notwithstanding these examples, other AI systems can be used as the AI system 114, and AI services may be used.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the AI system 114 to implement NLP and semantic analysis.

In a non-limiting arrangement, the AI system 114 can be a component of the data processing system 110, though this need not be the case. Nonetheless, in such an arrangement, the data processing system 110 can execute other applications/services of the AI system 114. In a further non-limiting arrangement, the data processing system 110 can be a component of one or more of the social systems 112. For example, the cognitive insight service 145 can execute as a background task/service in one or more of the social systems 112. In an arrangement in which each of the social systems 112 host respective copies/instances of the cognitive insight service 145, the respective copies/instances of the cognitive insight service 145 can communicate with each other via the communication network 140. In a further arrangement, the data processing system 110 can execute other applications/services hosted by one or more of the social systems 112, though this need not be the case.

In operation, the users 130-134 can access, via the client devices 120-124, the social systems 112 to access social media content 155 and share social media content 155. For example, the users 130-134 can access and read/view/listen to social media posts, blog posts, articles, work items, tasks, chats, e-mails, text messages, instant messages, etc., as well as post and/or generate social media content 155, entries to blogs, articles, work items, tasks, chat messages, e-mails, text messages, instant messages, and so on.

For users 130-134 whose security and privacy configuration settings indicate that their interactions with the social systems 112 may be monitored, the cognitive insight service 145 can interface with the social systems 112 and monitor interactions of the users 130-134 with the social systems 112 in accordance with the users' security and privacy settings, including monitoring social media content 155 accessed by the users 130-134 and social media content 155 shared by the users 130-134. Based on monitoring the interactions, the cognitive insight service 145 can generate, in real time, user activity data pertaining to the interactions of the users 130-134 with the social systems 112, and add that activity data to existing user activity data 160, which includes historical user activity data 160 pertaining to users 130-134 whose inactions with the social systems 112 are being monitored. The user activity data 160 can, for each user activity, indicate the user 130-134 who performed the user activity, the time/date when the activity is performed, the duration of time spent during the user activity, the social system(s) 112 accessed by the user 130-134 during the user activity, what is the user activity (e.g., reading, viewing or listening to social media content 155, generating social media content 155, etc.), which application(s) on the client system 120-124 and/or social systems 112 the user 130-134 was using to perform the user activity, social media content 155 presented to the user 130-134 during the user activity, social media content 155 generated and/or shared by the user 130-134 during the user activity, and so on. The user activity data 160 can be stored in a database, for example within one computer readable storage medium (e.g., memory elements) within the data processing system 110, or stored in a database stored on one or more computer readable storage mediums (e.g., storage devices and/or storage systems) to which the data processing system 110 is communicatively linked, for instance via the communication network 140.

Further, if the security and privacy configuration settings for the user 130 indicates that the user 130 desires to receive cognitive insights generated from user activities of the users 132, 134, responsive to detecting current user activity of a the user 130 interacting with one or more of the social systems 112, the cognitive insight service 145 can communicate, in real time, to the AI system 114 a message containing an activity notification 165 that indicates the current user activity of the user 130. In an arrangement, the cognitive insight service 145 can communicate the message further responsive to determining that the that the current user activity of the user is reading, viewing, and/or listening to social media content 155 for at least a threshold duration of time.

Responsive to receiving the activity notification 165, the AI system 114 can identify, in real time, the current user activity to which the activity notification 165 pertains, such as interacting with a social system 112. The AI system 114 can analyze, in real time, the current user activity. The analysis can include determining social media content 155 (e.g., a social media post, a blog post, an article, a work item, task, a chat, an e-mail, a text message, an instant message, etc.) which the user 130 reading, viewing and/or to which the user is listening, or determining social media content 155 the user 130 is sharing. Further, the analysis can include determining a duration of time the user 130 spends reading, viewing, and/or listening to the social media content 155, or a duration of time the user 130 spent generating and sharing the social media content 155. The analysis also can include determining one or more subjects of the social media content 155, identifying specific content within the social media content 155, identifying one or more contacts with whom the social media content 155 is shared, etc.

Further, responsive to receiving the activity notification 165, the AI system 114 can access, in real time, the user profiles 150 and identify users 132, 134 whose security and privacy configuration settings indicate that information relating to their interactions with the social systems 112 is authorized to be shared with the user 130, and can access user activity data 160 (including current user activity and historical user activity data) of those users 132, 134. The AI system 114 can analyze, in real time, the accessed user activity data 160 to determine user activity data 160 relating to the current user activity of the user 130 to which the activity notification 165 pertains. User activity data 160 relating to the current user activity of the user 130 can be user activity data 160 indicating that a user 132, 134 accessed the same social media content 155 as the user 130 during the current user activity, user activity data 160 indicating that a user 132, 134 accessed social media content 155 similar to the social media content 155 accessed and/or shared during the current user activity, user activity data 160 indicating that a user 132, 134 accessed social media content 155 relating to the social media content 155 accessed and/or shared during the current user activity, user activity data 160 indicating social media content 155 (e.g., social media post, blog post, e-mail, text message, instant message, etc.) shared by the user 132 and/or user 134 recommending social media content 155 to others, and so on. The AI system 114 can communicate, in real time, to the cognitive insight service 145 a message containing one or more activity indicators 170 indicating user activity data 160 of the users 132, 134 relating to the current user activity of the user 130.

Responsive to receiving the activity indicator(s) 170, the cognitive insight service 145 can generate, in real time, cognitive insight 175 for the social media content 155 to which the current user of the user 130 activity pertains. The cognitive insight service 145 can communicate the cognitive insight 175 to the social system 112 in which the current user activity takes place, and indicate to that social system 112 to present the user activity data 180 indicated by the cognitive insight 175 to the user 130, for example with the social media content 155 to which the current user activity pertains.

The cognitive insight 175 can include, for example, a listing of user activity data 180, selected from the user activity data 160 and indicted by the activity indicators 170, pertaining to the identified user activities of the users 132, 134 that relate to the current user activity of the user 130. Each user activity data 180 can indicate the user 132, 134 who performed the user activity to which the user activity data 180 pertains, a time/date in which the user activity was performed, etc. Each user activity data 180 also can indicate a duration of time spent by the respective user 132, 134 performing the user activity. For example, if the identified user activity is reading, viewing and/or listening to social media content 155 presented to the user 132, the user activity data 180 can indicate the duration of time the user read, viewed read/or listened to the social media content 155 (e.g., the duration of time the social media content 155 was presented to the user). If the user has highlighted any portions of the social media content 155, the user activity data 180 can indicate the portions highlighted and/or a version of the social media content 155 that includes the highlighting. Further, one or more of the user activity data 180 can indicate at least one social media content 155 to which the user activity data 180 pertains, which is different that the social media content 155 to which the current user activity pertains. For example, if a user activity data 180 indicates a first social media content 155 (e.g., social media post, blog post, e-mail, text message, instant message, etc.) recommending a second social media content 155 (e.g., social media post, blog post, article, etc.), the user activity data 180 can indicate both the first social media content 155 and the second social media content 155.

The cognitive insight service 145 can identify a topic of the user activity data 180, one or more key phrases contained in the user activity data 180 and/or the user 132, 134 associated with the user activity data 180, and create a summary of the user activity data 180 to be included in the cognitive insight 175 and initially presented to the user in the user activity data 180. The cognitive insight service 145 can configure the summary to be user selectable to view and/or drill down to additional information contained in the user activity data 180.

Responsive to receiving the cognitive insight 175 from the cognitive insight service 145, the social system 112 can present, in real time, to the user 130 each user activity data 180 contained in the cognitive insight 175. In illustration, the social system 112 can present the user activity data 180 in a graphical user interface (GUI) in which the social media content 155, to which the current user activity pertains, is being presented, for instance on a display of the client device 120. For example, the social system 112 can present the user activity data 180 above the social media content 155, below the social media content 155, next to the social media content 155, in a pop up window presented in the GUI, or in any other suitable manner. In some cases, the social system 112 can present a summary of each of the user activity data 180, for example a topic, one or more key phrases and/or the user 132, 134 associated with the user activity data 180. The user 130 can select a summary to expand that user activity data 180 to view and/or drill down to additional information contained in the user activity data 180.

If at least one user activity data 180 indicates at least one social media content 155 to which the user activity data 180 pertains, which is different that the social media content to which the current user activity pertains, the social system 112 also can present to the user the social media content 155 indicated by the at least one user activity data 180. In the case that the user 132 and/or user 134 has highlighted at least one portion of the social media content 155, the social system 112 can present a segment or segments of the social media content 155 that include the highlighted portion(s).

Presentation of the user activity data 180 of the other users 132, 134 and/or the social media content 155 indicated by the at least one user activity data 180 can provide to the user 130 insight into the social media content 155 that is the subject of the current user activity of the user 130. This insight can provide a better understanding to the users 132, 134 toward the social media content 155 that is the subject of the current user activity of the user 130. Based on the presented user activity data 180 and/or other social media content 155, the user 130 can determine how much time the user 130 should spend viewing, reading and/or listening to the social media content 155 that is the subject of the current user activity of the user 130, which can maximize the productivity and efficiency of the user 130 at using the social systems 112 for activities the user 130 is performing.

In an arrangement, the cognitive insight service 145 can determine a duration of time to present to the user 130 respective user activity data 180 of the users 132, 134, and indicate such durations of time in the cognitive insight 175. In such an arrangement, the social system 112 can present to the user 130 each user activity data 180 of the other users 132, 134 for the indicated duration of time. For example, assume the cognitive insight listing includes a first user activity data, a second user activity data, and a third user activity data. The cognitive insight service 145 can determine a first duration of time to present the first user activity data to the user 130, a second duration of time to present the second user activity data to the user 130, and a third duration of time to present the third user activity data to the user 130. The social system 112 can present, to the user 130, the first user activity data for the first duration of time, the second user activity data for the second duration of time, and the third user activity data for the third duration of time. Further, the cognitive insight service 145 can determine respective durations of time to present to the user 130 social media content 155 that are subjects of the user activities presented in the cognitive insight 175.

The cognitive insight service 145 (or the AI system 114) can determine the respective durations of time based on information relating to the social media content 155 that is the subject of the user activities presented in the cognitive insight 175. In illustration, responsive to receiving the activity indicator(s) 170, the cognitive insight service 145 (or the AI system 114) can access, in real time, the information relating to the social media content 155 that is the subject of the user activities indicated by the activity indicator(s) 170. Such information can include, for example, a number of users, including but not limited to the users 132, 134, who have accessed the social media content 155, comments provided for the social media content 155, likes or other indicators provided for the social media content 155, a duration of time the user 132 and/or user 134 spent reading, viewing and/or listening to the social media content 155, etc. The cognitive insight service 145 (or the AI system 114) can analyze such information to determine a popularity of the social media content 155 among users and/or a sentiment of the users toward the social media content 155. Based on the popularity and/or sentiment, the cognitive insight service 145 (or the AI system 114) can determine the duration of time the user activity data 180 pertaining to that social media content 155 is to be presented to the user 130. Further, in the case that cognitive insight service 145 (or the AI system 114) determines the social media content 155 that is the subject of the user activities presented in the cognitive insight 175 is to be presented to the user 130, based on the popularity of the social media content 155 and/or sentiment of users toward the social media content 155, the cognitive insight service 145 (or the AI system 114) can determine an duration of time the social media content 155 is to be presented to the user 130.

For example, the cognitive insight service 145 (or the AI system 114) can assign a popularity score to the social media content 155 based on a number of users who have accessed the social media content 155, a duration of time the user 132 and/or user 134 spent reading, viewing and/or listening to the social media content 155, etc., and assign a sentiment score based on analyzing sentiments expressed on comments, likes, etc., provided by users for the social media content 155. The cognitive insight service 145 (or the AI system 114) can sum the popularity score and the sentiment score to derive a total score, or derive the total score by assigning a weighting to the popularity score, assigning a weighting to the sentiment score, and summing the weighted scores. The duration of time each user activity data 180 in the listing is to be presented to the user 130 can be proportional to the total score assigned to the social media content 155 that is the subject of that particular user activity. Further, the duration of time that the social media content 155 is to be presented to the user 130 can be based on the total score assigned to the social media content 155.

Presenting to the user 130 the user activity data 180 of other users 132, 134 for the determined durations of time can provide ephemeral boosts to the user understanding of the social media content, which can enhance insight of the user 130 into the social media content 155 that is the subject of the current user activity of the user 130. The attention of the user 130 will be drawn to the user activity data 180, but will more heavily focus on user activity data 180 presented for a longer duration of time. This can further aid the user 130 in determining how much time the user 130 should spend viewing, reading and/or listening to the social media content 155, which can further maximize the productivity and efficiency of the user 130 at using the social systems 112 for activities the user 130 is performing.

The following use cases are useful for understanding the arrangements described herein. In an example use case, assume that a user 130 has been reading an interesting technology blog, and that the user 130 finds it very interesting and would like to discuss it further with a few interested parties. The user 130 may attempt to decide if the blog should be shared with a group of users in his/her network and identify who to reach out to discuss, however, user 32 may not have any insight into which other users may have read it, how long they spent on reading it etc. Without this information, the user 130 may have to ask around to find out, or wait till others to inform him/her about it.

The present arrangements overcome this problem. The cognitive insight service 145/AI system 114 can determine that the user 130 accesses the blog, and provide, in real time, to the user cognitive insight for the blog, leveraging data from other users 132, 134 who have authorized the data processing system 110 to share their activity data with the user 130. Thus, in response to the user 130 accessing the blog, the user 130 can be presented the real time cognitive insight which helps the user 130 to make informed decisions, such as deciding whether to read the blog further, with whom else the user 130 should share the blog, who user 132 should approach to discuss the blog, etc.

In this regard, the present arrangements allow any user 130-134 to specify which other users 130-134 the user wants to share the current user's user activity data 160, including social media posts, blog posts, articles, work items, tasks, chats, electronic mails (e-mails), text messages, instant messages, etc. Notwithstanding, the present arrangements can be scoped to providing certain user activities, for example to reading blogs, recommending blogs on medium.com, etc. The present arrangements also can be scoped to other certain user activities, for example activities related to completion of a task or work item, initiation of work on a task or work item, how much time, or how many times, spent on a task or work time, etc.

In another example use case, assume the user 130 reads blog B at 7 AM on Jun. 1, 2018 for 5 minutes, the user 130 reads blog B at 8 AM on Jun. 2, 2018 for 5 minutes, the user 132 shares blog B on a social networking cite on Jun. 2, 2018, and the user 134 recommends blog B to all his followers on a particular social system on Jun. 3, 2018. The cognitive insight service 145/AI system 114 can analyze the user activity of the user 130 to determine what the user 130 is doing on the client device 120, which application the user 130 is using, what specific user activity the user 130 is doing with that application, what content the user 130 is viewing or creating, and how long the user 130 has spent on the specific user activity. The cognitive insight service 145 can generate, in real time, cognitive insight into the current user activity of the user 130, based on security and privacy configuration settings of the user 130, and continuously collect data pertaining the current user activity to generate the cognitive insight 175.

The cognitive insight 175 can provide the latest relevant stream of user activity data 180, which can be presented at the top of the blog, or elsewhere, with a summary chart that captures how long other users 132, 134 spent on reading the blog over the past few months, and which allows the user 130 to drill into details if needed. Further, the cognitive insight 175 also can provide additional insight as the user reads the blog, such as portions of the blog highlighted by the user 132 and/or the user 134. As noted, presentation of the user activity data 180 can generate an ephemeral boost to the topic(s) that the user 130 is currently viewing and spending most time, based on other related social media content 155 that friends the social network of the user 130 have recommended or spent a significant amount of time reading. For example, topics related to the current blog can be presented for a specified duration of time.

FIG. 2 is a flowchart illustrating an example of a method 200 of presenting to a user activity data of other users. The method 200 can be implemented by the data processing system 110.

At step 202, the cognitive insight service 145 can monitor a current user activity of a first user interacting with a first social system.

At step 204, the cognitive insight service 145 can, responsive to the monitoring the current user activity of the first user interacting with the first social system, generate, in real time using a processor, a cognitive insight into at least one user activity of at least a second user relating to the current user activity of the first user, the cognitive insight comprising a listing of user activity data, each user activity data representing a respective user activity of at least the second user relating to the current user activity of the first user, and the cognitive insight indicating, for each user activity data contained in the listing, a respective duration of time for which the user activity data is to be presented to the first user.

At step 206, the cognitive insight service 145 can communicate the cognitive insight to the first social system, wherein, responsive to receiving the cognitive insight, the first social system presents, in real time, to the first user each user activity data contained in the listing of user activity data for the respective duration of time indicated in the cognitive insight. Presenting to the first user each user activity data contained in the listing of user activity data for the respective duration of time can provide an ephemeral boost that enhances insight of the first user into social media content accessed by the first user in the current user activity.

By way of example, the current user activity can be the first user reading, viewing or listening to social media content. Further, the generating the cognitive insight into the at least one user activity of at least a second user relating to the current user activity of the first user performed at step 204 further can be responsive to the first user reading, viewing or listening to the social media content for at least a threshold duration of time.

In another example, the user activity data can indicate social media content accessed by the user activity of at least the second user. The user activity data also can indicate a duration of time at least the second user read, viewed or listened to the social media content. Further, the first social system can present the social media content to the first user responsive to receiving the cognitive insight. The cognitive insight can indicate a duration of time to present the social media content accessed by the user activity of at least the second user, and the first social system can present the social media content for the duration of time indicated by the cognitive insight.

In another example, the user activity data can indicate a social media content accessed by the user activity of at least the second user. The user activity data also can indicate that at least one portion of the social media content was highlighted by at least the second user. The first social system can present a segment of the social media content comprising the at least one portion of the social media content that was highlighted by at least the second user.

FIG. 3 is a flowchart illustrating an example of a method 300 of analyzing user activity. In an arrangement in which the AI system 114 is a component of the data processing system 110, the method 300 can be implemented by the data processing system 110. In an arrangement in which the AI system 114 is not a component of the data processing system 110, the method 300 can be implemented by a data processing system to which the data processing system 110 is communicatively linked.

The generating the cognitive insight into the at least one user activity of at least the second user at step 204 of FIG. 2 can be responsive to the analyses performed in the following steps 302 and 304, and can be based on the analyses performed at steps 302 and 304.

At step 302, the AI system 114 can analyze the current user activity of the first user interacting with the first social system, the analyzing the current user activity comprising determining social media content which the first user is reading, viewing or to which the first user is listening.

At step 304, the AI system 114 can analyze the user activity of at least the second user interacting with at least one social system selected from a group consisting of the first social system and at least a second social system, the analyzing the user activity of at least the second user interacting with the at least one social system comprising determining the user activity of at least the second user relating to the current user activity of the first user.

Figure 4:
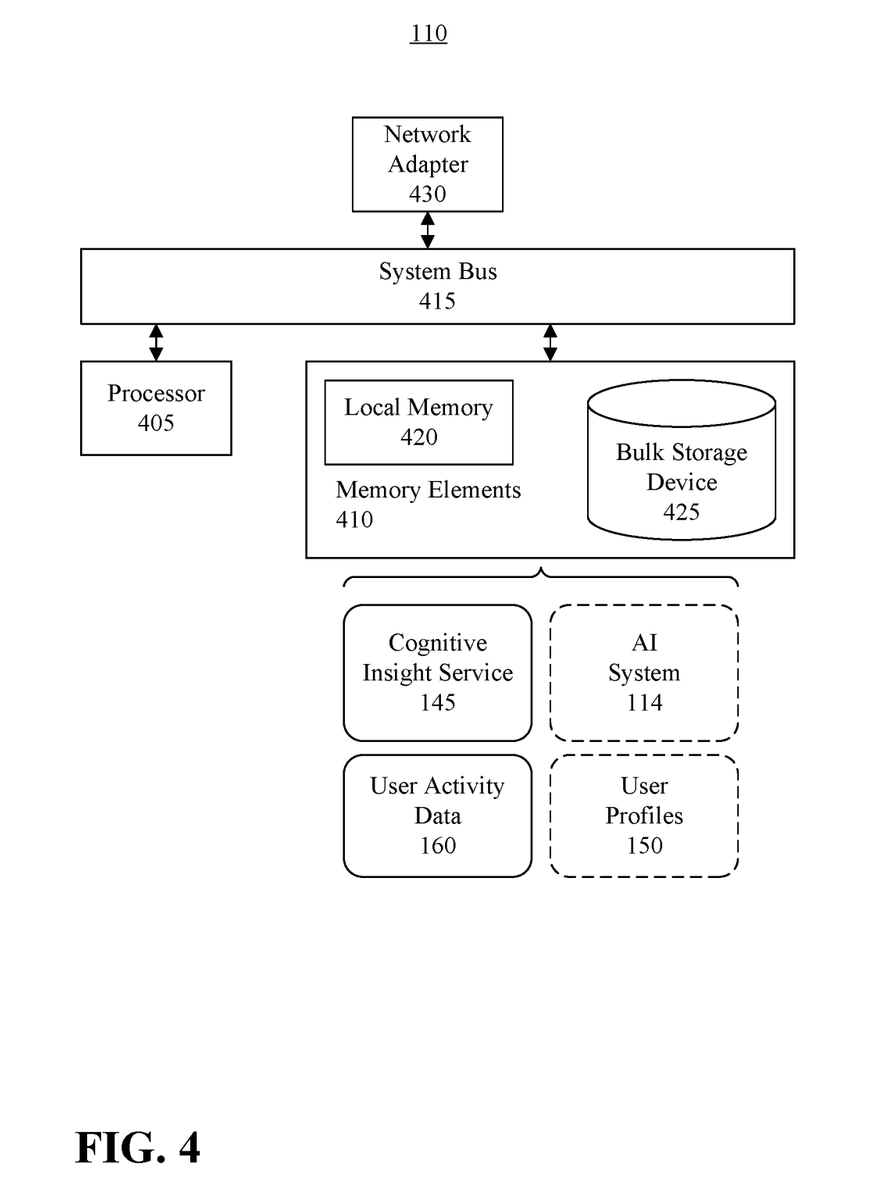
FIG. 4 is a block diagram illustrating example architecture for a data processing system.

FIG. 4 is a block diagram illustrating example architecture for the data processing system 110 of FIG. 1. The data processing system 110 can include at least one processor 405 (e.g., a central processing unit) coupled to memory elements 410 through a system bus 415 or other suitable circuitry. As such, the data processing system 110 can store program code within the memory elements 410. The processor 405 can execute the program code accessed from the memory elements 410 via the system bus 415. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, or the like.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 425 during execution.

One or more network adapters 430 can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 430 that can be used with the data processing system 110.

As pictured in FIG. 4, the memory elements 410 can store the components of the data processing system, namely the cognitive insight service 145 and the user activity data 160 and, optionally, the user profiles 150 and the AI system 114. As noted, in other arrangements, the user profiles 150 can be stored elsewhere, for example in the social systems 112 of FIG. 1 and the AI system 114 can be executed by one or more other data processing systems. Being implemented in the form of executable program code, these components of cognitive insight service 145 and, optionally, the AI system 114, can be executed by the data processing system 110 and, as such, can be considered part of the data processing system 110. Moreover, the cognitive insight service 145, user activity data 160, user profiles 150 and AI system 114 are functional data structures that impart functionality when employed as part of the data processing system 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   monitoring a current user activity of a first user interacting with a first social system;
   responsive to the monitoring the current user activity of the first user interacting with the first social system, generating, in real time using a processor, a cognitive insight into at least one user activity of at least a second user relating to the current user activity of the first user, the cognitive insight comprising a listing of user activity data, each user activity data representing a respective user activity of at least the second user relating to the current user activity of the first user, wherein the user activity data for the second user indicates a social media content accessed by the user activity of the second user and indicates that at least one portion of the social media content was highlighted by at least the second user, and the cognitive insight indicating, for each user activity data contained in the listing, a respective duration of time for which the user activity data is to be presented to the first user; and
   communicating the cognitive insight to the first social system, wherein, responsive to receiving the cognitive insight, the first social system presents, in real time, to the first user each user activity data contained in the listing of user activity data for the respective duration of time indicated in the cognitive insight, and the first social system presents a segment of the social media content comprising the at least one portion of the social media content that was highlighted by the second user.

2. The method of claim 1, wherein:
   the user activity data indicates social media content accessed by the user activity of at least the second user; and
   the first social system presents the social media content to the first user responsive to receiving the cognitive insight.

3. The method of claim 2, wherein:
the user activity data indicates a duration of time at least the second user read, viewed or listened to the social media content.

4. The method of claim 2, wherein:
the cognitive insight indicates a duration of time to present the social media content accessed by the user activity of at least the second user; and
the first social system presents the social media content for the duration of time indicated by the cognitive insight.

5. The method of claim 1, wherein presenting to the first user each user activity data contained in the listing of user activity data for the respective duration of time provides an ephemeral boost that enhances insight of the first user into social media content accessed by the first user in the current user activity.

6. The method of claim 1, further comprising:
analyzing the current user activity of the first user interacting with the first social system, the analyzing the current user activity comprising determining social media content which the first user is reading, viewing or to which the first user is listening; and
analyzing the user activity of at least the second user interacting with at least one social system selected from a group consisting of the first social system and at least a second social system, the analyzing the user activity of at least the second user interacting with the at least one social system comprising determining the user activity of at least the second user relating to the current user activity of the first user;
wherein the generating, in real time using the processor, the cognitive insight into the at least one user activity of at least the second user further is responsive to the analyzing the current user activity of the first user interacting with the first social system and the analyzing the user activity of at least the second user interacting with the at least one social system selected from the group consisting of the first social system and at least the second social system.

7. The method of claim 1, wherein:
the current user activity of the first user is reading, viewing or listening to social media content; and
the generating, in real time using the processor, the cognitive insight into the at least one user activity, of at least the second user, further is responsive to the first user reading, viewing or listening to the social media content for at least a threshold duration of time.

8. A system, comprising:
a processor programmed to initiate executable operations comprising:
monitoring a current user activity of a first user interacting with a first social system;
responsive to the monitoring the current user activity of the first user interacting with the first social system, generating, in real time, a cognitive insight into at least one user activity of at least a second user relating to the current user activity of the first user, the cognitive insight comprising a listing of user activity data, each user activity data representing a respective user activity of at least the second user relating to the current user activity of the first user, wherein the user activity data for the second user indicates a social media content accessed by the user activity of the second user and indicates that at least one portion of the social media content was highlighted by at least the second user, and the cognitive insight indicating, for each user activity data contained in the listing, a respective duration of time for which the user activity data is to be presented to the first user; and
communicating the cognitive insight to the first social system, wherein, responsive to receiving the cognitive insight, the first social system presents, in real time, to the first user each user activity data contained in the listing of user activity data for the respective duration of time indicated in the cognitive insight, and the first social system presents a segment of the social media content comprising the at least one portion of the social media content that was highlighted by the second user.

9. The system of claim 8, wherein:
the user activity data indicates social media content accessed by the user activity of at least the second user; and
the first social system presents the social media content to the first user responsive to receiving the cognitive insight.

10. The system of claim 9, wherein:
the user activity data indicates a duration of time at least the second user read, viewed or listened to the social media content.

11. The system of claim 9, wherein:
the cognitive insight indicates a duration of time to present the social media content accessed by the user activity of at least the second user; and
the first social system presents the social media content for the duration of time indicated by the cognitive insight.

12. The system of claim 8, wherein presenting to the first user each user activity data contained in the listing of user activity data for the respective duration of time provides an ephemeral boost that enhances insight of the first user into social media content accessed by the first user in the current user activity.

13. The system of claim 8, the executable operations further comprising:
analyzing the current user activity of the first user interacting with the first social system, the analyzing the current user activity comprising determining social media content which the first user is reading, viewing or to which the first user is listening; and
analyzing the user activity of at least the second user interacting with at least one social system selected from a group consisting of the first social system and at least a second social system, the analyzing the user activity of at least the second user interacting with the at least one social system comprising determining the user activity of at least the second user relating to the current user activity of the first user;
wherein the generating, in real time, the cognitive insight into the at least one user activity of at least the second user further is responsive to the analyzing the current user activity of the first user interacting with the first social system and the analyzing the user activity of at least the second user interacting with the at least one social system selected from the group consisting of the first social system and at least the second social system.

14. The system of claim 8, wherein:
the current user activity of the first user is reading, viewing or listening to social media content; and
the generating, in real time using the processor, the cognitive insight into the at least one user activity, of at least the second user, further is responsive to the first user reading, viewing or listening to the social media content for at least a threshold duration of time.

15. A computer program product, comprising:
a computer readable storage medium having program code stored thereon, the program code executable by a data processing system to initiate operations including:
monitoring a current user activity of a first user interacting with a first social system;
responsive to the monitoring the current user activity of the first user interacting with the first social system, generating, in real time, a cognitive insight into at least one user activity of at least a second user relating to the current user activity of the first user, the cognitive insight comprising a listing of user activity data, each user activity data representing a respective user activity of at least the second user relating to the current user activity of the first user, wherein the user activity data for the second user indicates a social media content accessed by the user activity of the second user and indicates that at least one portion of the social media content was highlighted by at least the second user, and the cognitive insight indicating, for each user activity data contained in the listing, a respective duration of time for which the user activity data is to be presented to the first user; and
communicating the cognitive insight to the first social system, wherein, responsive to receiving the cognitive insight, the first social system presents, in real time, to the first user each user activity data contained in the listing of user activity data for the respective duration of time indicated in the cognitive insight, and the first social system presents a segment of the social media content comprising the at least one portion of the social media content that was highlighted by the second user.

16. The computer program product of claim 15, wherein presenting to the first user each user activity data contained in the listing of user activity data for the respective duration of time provides an ephemeral boost that enhances insight of the first user into social media content accessed by the first user in the current user activity.

17. The computer program product of claim 15, wherein the program code is executable by the data processing system to initiate operations further comprising:
analyzing the current user activity of the first user interacting with the first social system, the analyzing the current user activity comprising determining social media content which the first user is reading, viewing or to which the first user is listening; and
analyzing the user activity of at least the second user interacting with at least one social system selected from a group consisting of the first social system and at least a second social system, the analyzing the user activity of at least the second user interacting with the at least one social system comprising determining the user activity of at least the second user relating to the current user activity of the first user;
wherein the generating, in real time, the cognitive insight into the at least one user activity of at least the second user further is responsive to the analyzing the current user activity of the first user interacting with the first social system and the analyzing the user activity of at least the second user interacting with the at least one social system selected from the group consisting of the first social system and at least the second social system.

18. The computer program product of claim 15, wherein:
the current user activity of the first user is reading, viewing or listening to social media content; and
the generating, in real time using the processor, the cognitive insight into the at least one user activity, of at least the second user, further is responsive to the first user reading, viewing or listening to the social media content for at least a threshold duration of time.

* * * * *